(No Model.)
W. G. JONES.
Vessel for Containing Milk and other Articles.
No. 232,186. Patented Sept. 14, 1880.
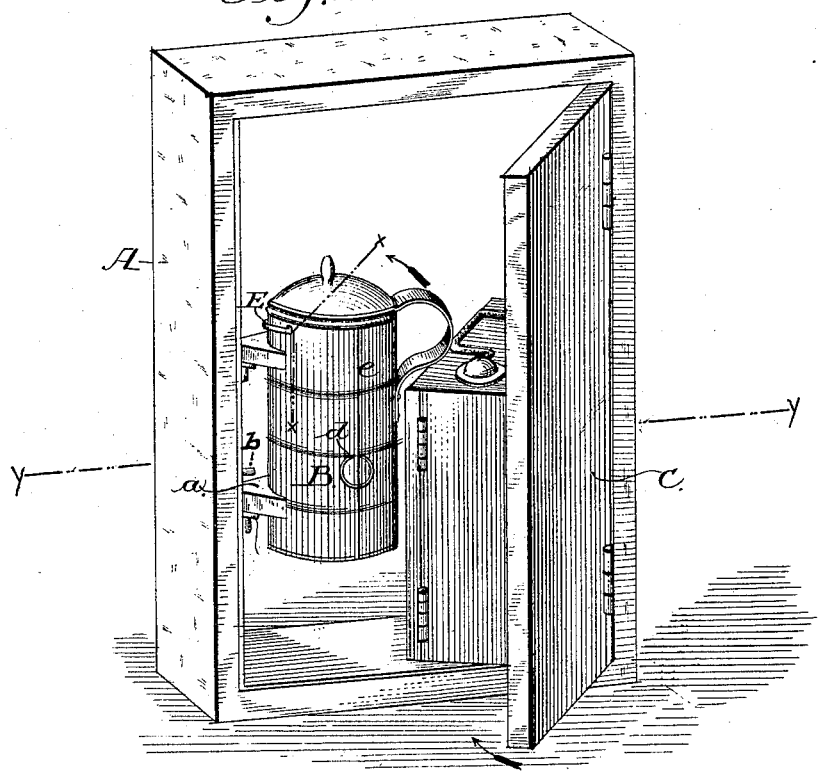
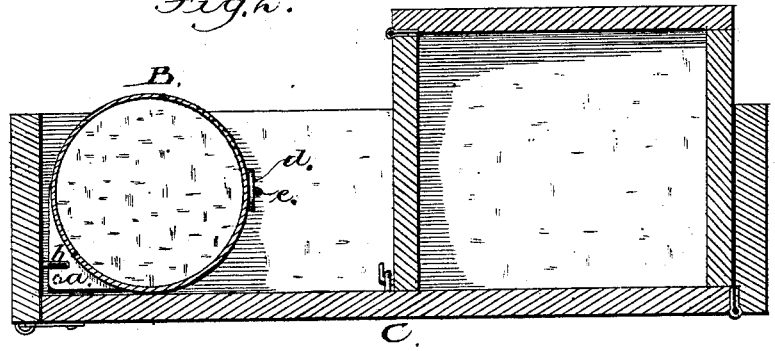
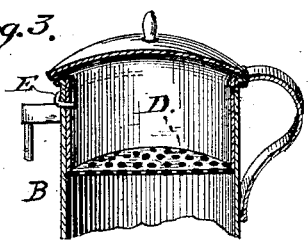
Witnesses:
J. Walter Fowler,
W. H. Morsell
Inventor;
Wm. G. Jones
by A. H. Evans & Co
his Attys

United States Patent Office.

WILLIAM G. JONES, OF SAN JOSÉ, CALIFORNIA.

VESSEL FOR CONTAINING MILK AND OTHER ARTICLES.

SPECIFICATION forming part of Letters Patent No. 232,186, dated September 14, 1880.

Application filed June 30, 1880. (No model.)

*To all whom it may concern:*

Be it known that I, WILLIAM G. JONES, of San José, State of California, have invented certain new and useful Improvements in Vessels for Containing Milk and other Articles, of which the following is a clear, full, and exact description, reference being had to the accompanying drawings, making part of this specification, in which—

Figure 1 is a perspective view of the vessel with the door open. Fig. 2 is a horizontal section through $x\ x$. Fig. 3 shows a section exposing a strainer.

This invention is designed to be placed outside of a dwelling for the purpose of containing milk or other articles to be left for the occupants of the house; and the invention consists of devices as hereinafter described, and is an improvement on Patent No. 213,206, issued to me March 11, 1879.

To enable others skilled in the art to make and use my invention, I will proceed to describe the exact manner in which I have carried it out.

In the drawings, A represents the door-frame, and B the vessel, hinged on the frame outside the door, as shown in Fig. 1.

When the door C is closed it presses against the vessel B and forces it back against the frame A, the hinge $a$ passing under the stop $b$ and securing the vessel against the possibility of being lifted from its hinges or removed from its position. It is only when the door C is open that the vessel B can be swung forward clear of the stop and be released from the stop $b$, so as to be lifted from its hinges and removed when desired.

The vessel B, designed particularly for receiving milk for the family, may be graduated so as to indicate the different measurements— pint, quart, gallon, &c.; and a ring, $d$, sliding on a vertical wire, $e$, may be conveniently used to indicate to the milkman the quantity of milk desired by simply sliding the ring along the wire until opposite the point to which the vessel is to be filled.

In the top of the vessel may be placed the strainer D, for the protection of the milk and to prevent its being stolen. This strainer may be secured by the spring-pin E, or by any other convenient means.

Having thus explained my invention, what I claim as new, and desire to secure by Letters Patent, is—

The vessel B, provided with the hinges $a$, in combination with the frame A, having hinge-supports and stop $b$, and with the door C, all constructed to operate substantially as and for the purpose set forth.

WILLIAM G. JONES.

Witnesses:
C. C. REDMOND,
A. W. WHITE.